US012676478B2

(12) United States Patent
Skliutas

(10) Patent No.: US 12,676,478 B2
(45) Date of Patent: Jul. 7, 2026

(54) POWER SUPPLY NETWORKS

(71) Applicant: GE Infrastructure Technology LLC, Greenville, SC (US)

(72) Inventor: John Skliutas, Schenectady, NY (US)

(73) Assignee: GE VERNOVA INFRASTRUCTURE TECHNOLOGY LLC, Greenville, SC (US)

( * ) Notice: Subject to any disclaimer, the term of this patent is extended or adjusted under 35 U.S.C. 154(b) by 148 days.

(21) Appl. No.: 18/822,758

(22) Filed: Sep. 3, 2024

(65) Prior Publication Data

US 2025/0096562 A1     Mar. 20, 2025

(30) Foreign Application Priority Data

Sep. 15, 2023   (EP) ..................................... 23197808

(51) Int. Cl.
| | |
|---|---|
| *H02J 3/001* | (2026.01) |
| *H02J 3/0073* | (2026.01) |
| *H02J 3/17* | (2026.01) |
| *H02J 3/38* | (2006.01) |
| *H02J 3/36* | (2006.01) |

(Continued)

(52) U.S. Cl.
CPC ........ *H02J 3/00125* (2020.01); *H02J 3/0073* (2020.01); *H02J 3/17* (2026.01); *H02J 3/381* (2013.01); *H02J 3/36* (2013.01); *H02J 2101/24* (2026.01); *H02J 2101/28* (2026.01); *H02M 1/32* (2013.01)

(58) Field of Classification Search
CPC ........... H02M 1/32; H02J 3/00125; H02J 3/36
See application file for complete search history.

(56) References Cited

U.S. PATENT DOCUMENTS

| | | | | |
|---|---|---|---|---|
| 4,447,765 A | * | 5/1984 | Cote ....................... | H02M 5/08 |
| | | | | 315/227 R |
| 2013/0016541 A1 | * | 1/2013 | Norrga ................ | H02M 7/7575 |
| | | | | 363/52 |

(Continued)

FOREIGN PATENT DOCUMENTS

CN          116191395 A      5/2023

OTHER PUBLICATIONS

Extended European Search Report issued in EP Application No. 23197808.1 dated Mar. 6, 2024 (with translation of reference), 22 pages.

*Primary Examiner* — Gary A Nash
(74) *Attorney, Agent, or Firm* — Eversheds Sutherland (US) LLP

(57) ABSTRACT

An electrical assembly for an AC network, including a first subcircuit electrically connected, in series, between first and second electrical points of connection. The first subcircuit includes a capacitor means, a first reactor means, and a second reactor means, in series with each other. A first switching means is electrically connected in parallel with the first reactor means. A second switching means is electrically connected in parallel with the second reactor means. A second subcircuit is electrically connected in parallel with the capacitor means, and includes a varistor means. A third subcircuit is electrically connected in parallel with the second subcircuit and includes a third reactor means and a third switching means. The first, second, and third switching means can be configured to providing a multifunctionality to the electrical assembly.

19 Claims, 7 Drawing Sheets

(51) Int. Cl.
    *H02J 101/24*        (2026.01)
    *H02J 101/28*        (2026.01)
    *H02M 1/32*         (2007.01)

(56) References Cited

U.S. PATENT DOCUMENTS

2014/0126255 A1*   5/2014   Wilmot ................. H02H 9/041
                                         363/56.01
2016/0211669 A1*   7/2016   Barker ................. H02H 7/1257
2017/0070047 A1*   3/2017   Shen ................... H02M 7/4835
2018/0301980 A1*  10/2018   Keister ................ H02M 1/088

* cited by examiner

600

610

620

630

700

710

720

730

740

POWER SUPPLY NETWORKS

FIELD

The subject matter herein relates generally to the field of power supply networks and more specifically to electrical assemblies and methods for operating power supply networks.

INTRODUCTION

Power supply networks are used to provide electrical power from power generation networks to consumers. The power supply network tends to operate at a number of different alternating current (AC) voltages. Typically, the AC voltages are transformed from higher voltages to lower voltages as the electrical power progresses through the power supply network.

Increasingly, power supply networks are expanding to include more transmission lines and are also receiving electrical power from additional generation sources including renewable power installations. The latter includes wind, solar, battery, pumped hydro, and geo-thermal power generation installations. The integration of renewable power generation sources has presented certain challenges for power supply network operators seeking to manage power flow through the power supply network to a consumer.

SUMMARY

The operation of a modern-day power transmission system may encounter different challenges during the day, during the week, or for extended periods of time. These challenges can include: 1) periods of excessive short circuit currents, 2) periods of lower short circuit currents (i.e., weak grids) (often associated with lower power flows and larger voltage variations), 3) the need to improve the power quality at voltage sensitive loads by minimizing voltage dips during local faults, and 4) the need to adjust power flow in parallel connected transmission circuits as required to avoid equipment (line and/or station) overloading during normal or contingency conditions or preventing power flow loops.

Short circuit currents in power supply networks are increasing due to several factors including additional transmission lines, new thermal generation, as well as the connection of renewable power generation networks, such as large windfarms and solar farms. As a result, in some transmission stations, the short circuit interrupting rating of existing circuit breakers are approaching, or in some circumstances exceeding, their limits. The installation of higher-rated circuit breakers is the normal course of action but can prove disruptive (in terms of cost and integration) to deploy within existing power supply networks. For instance, a power provider cannot just upgrade one circuit breaker in a power supply network—it is generally the case that all circuit breakers must be upgraded to have the new electrical rating. Furthermore, higher-rated circuit breakers may not be available for the levels of short circuit current at the operating voltage of the power supply station required.

There is also concern among utility providers that certain renewable power generation networks can be inconsistent or variable with their electrical power supply. By way of example and considering a solar power generation network, during the day the electrical power supplied from the solar power generation network may be substantive (and short circuit currents may be relatively high), but during the night the electrical power supplied will be much lower (and accordingly, the short circuit currents will be lower). This leads to a scenario whereby the demand for protection from short circuit currents increases and decreases at different times of the day. Furthermore, the power supply network may resultantly be weaker at night, leading to voltage regulation issues and/or decreased power flows.

Faults within a power supply network and/or power generation network, can cause voltage dips (or, in some instances, even voltages going as low as zero volts). For voltage sensitive loads, such as paper mills, refineries, computer chip factories, data centres, military installations, and critical government complexes, limiting voltage dips at the entrance to the plant can prevent the interruption of internal plant processes.

Furthermore, other operational challenges may arise when managing a transmission grid such as adjusting the power flow among parallel connected transmission lines, minimizing power loop flows, and reducing power flow on lines operating near, or at, thermal limits.

It is therefore desirable to provide electrical assemblies and methods of operation for power supply networks, that can mitigate these issues.

According to a first aspect, there is provided an electrical assembly, comprising: a first electrical point of connection and a second electrical point of connection, for connecting, respectively, to a transmission means of an alternating current (AC) network; a first subcircuit electrically connected, in series, between the first and second electrical points of connection, the first subcircuit comprising: a capacitor means; a first reactor means, electrically connected between the capacitor means and the first electrical point of connection, the first reactor means being in series with the capacitor means; a second reactor means, electrically connected between the capacitor means and the second electrical point of connection, the second reactor means being in series with the capacitor means; a first switching means, electrically connected in parallel with the first reactor means, wherein the first switching means is operable between a first conducting state and a first non-conducting state, to respectively bypass or include the first reactor means in the first subcircuit; a second switching means, electrically connected in parallel with the second reactor means, wherein the second switching means is operable between a second conducting state and a second non-conducting state, to respectively bypass or include the second reactor means in the first subcircuit; a second subcircuit, electrically connected in parallel with the capacitor means, the second subcircuit comprising a varistor means; a third subcircuit, electrically connected in parallel with the second subcircuit, the third subcircuit comprising: a third switching means, the third switching means being operable between a third conducting state and a third non-conducting state, to respectively connect or disconnect the third subcircuit of the electrical assembly; wherein the electrical assembly further comprises a third reactor means, the third reactor means being either electrically connected in series with the capacitor means or electrically connected in series with the third switching means as part of the third subcircuit.

The inventor has realized that the problems discussed herein can be solved by providing a multi-function electrical assembly that can adapt to power network conditions, maximizing power network performance. This is achieved by providing the first, second and third switching means, that can be individually operated to either insert or bypass electrical components of the electrical assembly. The electrical assembly can be reconfigured to provide fault current limiting (FCL), fault dip limiting (FDL), a series capacitor (SC), or a power flow modifier (PFM). The electrical assembly tends to be operated in any of these configurations from minutes to months, for instance. Compared to the cost of separate electrical assemblies for each purpose, the electrical assembly disclosed herein offers significant cost savings. Further, the electrical assembly disclosed herein can be retrofitted to existing hardware (i.e., existing series-capacitor banks) to allow for the conversion of the existing hardware to provide the multifunction FCL/FDL/SC/PFM arrangement. The capacitor means may account for up to more than one-half of the cost of the electrical assembly, so being able to retrofit this solution to existing capacitor banks in power supply networks tends to be particularly financially attractive, as well as only requiring a modest increase in spatial footprint.

Some embodiments further comprise: a fourth switching means, electrically connected in series with the first subcircuit, between the first subcircuit and the first electrical point of connection, the fourth switching means being operable between a fourth conducting state and a fourth non-conducting state, to respectively connect or disconnect the first subcircuit from the first electrical point of connection; and a fifth switching means, electrically connected in series with the first subcircuit, between the first subcircuit and the second electrical point of connection, the fifth switching means being operable between a fifth conducting state and a fifth non-conducting state, to respectively connect of disconnect the first subcircuit from the second electrical point of connection.

By providing the fourth and fifth switching means, the electrical assembly can be connected or disconnected from the AC network to which it is deployed. This allows the electrical assembly to be taken out of service when required.

Some embodiments further comprise: a fourth subcircuit, electrically connecting the first electrical point of connection to the second electrical point of connection, wherein the fourth subcircuit comprises: a sixth switching means, the sixth switching means being operable between a sixth conducting state and a sixth non-conducting state, to respectively bypass or include the first, second, and third subcircuits of the electrical assembly.

By providing the fourth subcircuit, the electrical assembly can not only be taken out of service when required, but the electrical connection between the first and second electrical points of connection can be established directly, by configuring the sixth switching means into the sixth conducting state. Hence the electrical assembly can be completely bypassed when required.

In some embodiments, the fourth and fifth switching means are configured in the respective fourth and fifth conducting states, and the first, second, third and sixth switching means are configured in the respective first, second, third and sixth non-conducting states, such that the electrical assembly operates as a fault current limiter (FCL) and/or a fault dip limiter (FDL).

When operating as an FCL (i.e., in scenarios where the AC network is 'strong'), both of the first and second reactor means and the capacitor means are in service with a resonant frequency equal to a frequency of the electrical power being transmitted through the power network, such that the voltage drop across the electrical assembly is nearly zero, except for voltage drop across equipment resistance, thus not affecting load flow. In the event of a local fault, the capacitor-means is partially bypassed by the varistor means. In some embodiments, a triggered airgap may also be provided, in which case the capacitor means tends to be completely bypassed thus leaving the first and second reactor means to limit any short circuit currents. This tends to protect circuit breakers and/or switchgear from being overloaded by excessive fault/short circuit currents. Hence, the existing circuit breakers, switches, and electrical bus, can remain in service and operate within their limits.

The FDL configuration is the same configuration as the FCL and acts to provide power quality to a local load. This tends to ensure that a retained voltage at a voltage sensitive load is maximized and will experience limited voltage dips when the FDL is connected between an electrical fault and the voltage sensitive load. Put differently, the FDL configuration improves power quality to electrical loads and to parallel connected circuits (i.e., at a power station/AC network bus).

In some embodiments, the first, second, fourth, and fifth switching means are configured in the respective first, second, fourth and fifth conducting states, and the third and sixth switching means are configured in the respective third and sixth non-conducting states, such that the electrical assembly operates as a series-capacitor (SC).

Operating as a SC, the electrical assembly tends to strengthen the AC network by increasing power flow on the transmission means. This can mitigate voltage regulation issues that may be experienced across a day, for instance, during the night when electrical grid is weaker when solar power generation is negligible.

In some embodiments, the third, fourth, and fifth switching means are configured in the respective third, fourth and fifth conducting states, the sixth switching means is configured in the sixth non-conducting state, and at least one of the first and second switching means are configured in the respective first and second non-conducting states (i.e., with at least one conducting reactor) such that the electrical assembly operates as a power flow modifier (PFM).

In the PFM configuration the capacitor-means is bypassed. The series-reactance of the electrical assembly is increased to decrease power flow in the transmission means. The electrical assembly provides the option to connect one or two reactor means in series with the transmission means. This tends to be advantageous where the relative power flow requires adjusting between a plurality of parallel transmission lines of the transmission means. The PFM configuration may also be used to minimize power loop flows and reduce power flow on transmission lines operating at, or near, thermal limits.

In some embodiments, the sixth switching means is configured in the sixth conducting state, and the fourth and fifth switching means are configured in the respective fourth and fifth non-conducting states, such that the electrical assembly operates in an out-of-service state.

As hereinbefore described, the out-of-service state allows the electrical assembly to be completely bypassed when required i.e., electrical power flowing through the transmission means will bypass the electrical assembly.

Some embodiments further comprise: a controller means configured to provide respective control signals to the first, second, third, fourth, fifth, and sixth, switching means, to operate the first, second, third, fourth, fifth and sixth switching means between their respective conducting and non-conducting states.

The controller means provides the control signals that may be used to operate the switching means of the electrical assembly. The controller means may automatically control the switching means of the electrical assembly. The controller means may provide an interface for an operator to control the switching means of the electrical assembly. The controller means may comprise one or more processors and a memory coupled with the processor, for instance, wherein the memory comprises instructions that when executed by the processor, cause the controller means to operate the switching means.

In some embodiments, the varistor means comprises a metal-oxide varistor (MOV). The MOV absorbs power and energy when a fault current flows through the electrical assembly. The MOV can operate passively and autonomously.

In some embodiments, the first, second and third reactor means comprise respective air-core, iron-core or oil-filled reactors. Whilst the reactor means may comprise oil filled reactors, these can be expensive to manufacture and deploy but may be the only option when high reactance and/or high currents are required. 'Dry' reactors or air-core reactors are therefore preferred if requirements can be met with an air-core type design.

In some embodiments, the third subcircuit further comprises a triggered gap and/or a power electronics.

The triggered air gap and/or power electronics allows for a reduction in the size of the varistor means (i.e., the MOV). This is because the electrical rating of the varistor means can be reduced. Put differently, the use of a triggered air gap and/or power electronics can reduce the cost and spatial size of the varistor means. The triggered air gap normally operates autonomously once pre-firing conditions measured on the platform reach set thresholds or can be operated from a ground generated signal allowing capacitor bypass when required to limit short circuit contribution. The power electronics may, for instance, comprise Thyristor technologies. By providing the triggered air gap and/or power electronics (i.e., in series with the third reactor means), if the triggered air gap and/or power electronics are in a conductive state, the electrical power will still pass through the third reactor means.

According to a second aspect, there is provided an AC network, comprising: a transmission means; and the electrical assembly of the first aspect, wherein the first and second electrical points of connection are electrically connected to the transmission means.

It is anticipated that the deployment of the electrical assembly will tend to comprise providing the capacitor means on an insulated platform, given that the capacitor means tends to be at the voltage of the transmission means. The reactor means (of the first and third subcircuits) may be physically located to the side of the insulated platform.

In some embodiments, the first and second electrical points of connection are electrically connected in series to one or more transmission lines of the transmission means. Alternatively, the first and second electrical points of connection are electrically connected to split an electrical bus or busses of the transmission means (i.e., transmission station), into two or more sections. An electrical station may be configured as a single bus or multiple busses. Either arrangement provides a solution to limit short circuit currents experienced in the AC network/station. The location of deployment may determine the quantity of the electrical assemblies required and hence the power/utility provider may select the most appropriate deployment location considering factors, such as, construction footprint.

In some embodiments, the AC network is configured to operate at: an AC voltage between distribution voltage and ultra-high voltage (UHV), more preferably above 100 kV, even more preferably between 100 kV and 765 kV. The invention described herein tends to be applicable to any AC voltage between distribution and ultra-high voltage (UHV). The most practical applications are expected at HV and EHV while UHV is 765 kV. In this case, HV is defined as 100 kV to 345 kV (nominal) and EHV is defined as 345 kV to 765 kV (nominal) voltages.

In some embodiments, the AC network comprises multiple generation sources including conventional generation as well as renewable power generation network, more preferably a solar power generation network or a wind power generation network. As described herein, the electrical assembly tends to provide a solution to the short circuit current problems being experienced by any power supply networks that are connected to conventional or renewable power generation networks.

According to a third aspect, there is provided a method of operating an electrical assembly in an AC network, the method comprising: providing the electrical assembly of the first aspect; electrically connecting the first and second electrical points of connection to a transmission means of an AC network; and then operating at least the first, second, and third switching means.

According to a fourth aspect, there is provided a method of assembling an electrical assembly for an AC network, the method comprising: providing first and second electrical points of connection, for connecting to a transmission means of an AC network; assembling a first subcircuit to be electrically connected in series between the first and second electrical points of connection, wherein the assembling the first subcircuit comprises: providing a capacitor means; electrically connecting a first reactor means between the capacitor means and the first electrical point of connection, the first reactor means being in series with the capacitor means; electrically connecting a second reactor means between the capacitor means and the second electrical point of connection, the second reactor means being in series with the capacitor means; electrically connecting a first switching means in parallel with the first reactor means, the first switching means being operable between a first conducting state and a first non-conducting state, to respectively bypass or include the first reactor means in the first subcircuit; electrically connecting a second switching means in parallel with the second reactor means, the second switching means being operable between a second conducting state and a second non-conducting state, to respectively bypass or include the second reactor in the first subcircuit; assembling a second subcircuit to be electrically connected in parallel with the capacitor means, wherein the assembling the second subcircuit comprises: providing a varistor means; assembling a third subcircuit to be electrically connected in parallel with the second subcircuit, wherein the assembling the third subcircuit comprises: providing a third reactor means; providing a third switching means, the third switching means being operable between a third conducting state and a third non-conducting state, to respectively connect or disconnect the third subcircuit in the electrical assembly; wherein the third reactor means is either electrically connected in series with the capacitor means or electrically connected in series with the third switching means as part of the third subcircuit.

In some embodiments, the method further comprises: electrically connecting a fourth switching means in series with the first subcircuit, and between the first subcircuit and the first electrical point of connection, wherein the fourth switching means is operable between a fourth conducting state and a fourth non-conducting state, to respectively connect or disconnect the first subcircuit from the first electrical point of connection; electrically connecting a fifth switching means in series with the first subcircuit, and between the first subcircuit and the second electrical point of connection, wherein the fifth switching means is operable between a fifth conducting state and a fifth non-conducting state, to respectively connect or disconnect the first subcircuit from the second electrical point of connection; and assembling a fourth subcircuit electrically connecting the first electrical point of connection to the second electrical point of connection, wherein the assembling the fourth subcircuit comprises: electrically connecting a sixth switching means, the sixth switching means being operable between a sixth conducting state and a sixth non-conducting state, to respectively bypass or include the first, second and third subcircuits in the electrical assembly.

It will be appreciated that particular features of different aspects of the invention share the technical effects and benefits of corresponding features of other aspects of the invention. More specifically, the AC network, method of use, and method of assembly, share the technical effects and benefits of the electrical assembly of the invention.

The invention as described herein tends, in series capacitor mode (SC), to strengthen the AC network/AC grid. If the grid is strong and if short circuit currents are excessive, the invention described herein tends to help limit short circuit currents and operate in the fault current limiter (FCL) mode. If there are lines operating in parallel which require adjustments in load flow, the invention described herein tends to operate in power flow modifier (PFM) mode. An additional benefit to FCL operation tends to be that a fault dip limiter (FDL) operation occurs at the same time and station busses and loads are separated from the fault location by the FDL and the load will experience limited voltage dips.

The invention described herein tends to provide a solution to limit short circuit currents when breaker replacement with higher interrupting ratings is not an option i.e., when breakers with higher interrupting ratings do not exist in the marketplace because they have not yet been developed.

The invention described herein tends to be effective at limiting short circuit currents with installation in two different station locations: 1) splitting one or more station busses into 2 or more sections or 2) connecting the assembly in series with one or more transmission lines. The station location tends to affect the quantity of units required and the utility company can select the best option for their station considering factors such as available construction footprint.

The invention described herein tends to be constructed separate, or next to, an operating substation or transmission line such as to not disturb the existing AC grid. When completed, the electrical assembly can be connected to the station or line(s) in a few hours to a few days to minimize impact to the operating AC grid.

The invention described herein tends to allow incremental implementation. As new transmission circuits are connected to an existing power station or as new power generation projects are connected to existing lines, the electrical assembly can be installed as required to limit short circuit currents in the local station. The invention described herein tends to be an option for developers to install and mitigate the contribution of their project when the power stations are operating near circuit breaker short circuit limits. The invention described herein tends to allow incremental implementation when circuit breaker replacement is an all or nothing option.

The invention described herein tends to be able to operate with an MOV or with an MOV with triggered air gap. The MOV is a passive design and operates autonomously. On the other hand, the triggered air gap also operates autonomously but also has the option to fire from ground which would enable a user to bypass one or multiple series capacitor(s)

within the electrical assembly by using a command, provided initial triggering conditions are met to limit short circuit contribution from more than one circuit at a time, thus maximizing the current limiting effect.

The invention described herein is a modest-cost upgrade to the existing series capacitor banks present in AC networks/power stations.

For completeness, the technical advantages of the invention described herein are not intended to be limiting.

It will also be appreciated that the use of the terms "first" and "second", and the like, are merely intended to help distinguish between similar features and are not intended to indicate a relative importance of one feature over another, unless otherwise specified.

Within the scope of this application it is expressly intended that the various aspects, embodiments, examples and alternatives set out in the preceding paragraphs, and the claims and/or the following description and drawings, and in particular the individual features thereof, may be taken independently or in any combination. That is, all embodiments and all features of any embodiment can be combined in any way and/or combination, unless such features are incompatible.

BRIEF DESCRIPTION OF THE DRAWINGS

Embodiments of the invention will now be described by way of example only and with reference to the accompanying drawings, in which.

DETAILED DESCRIPTION

Figure 1:
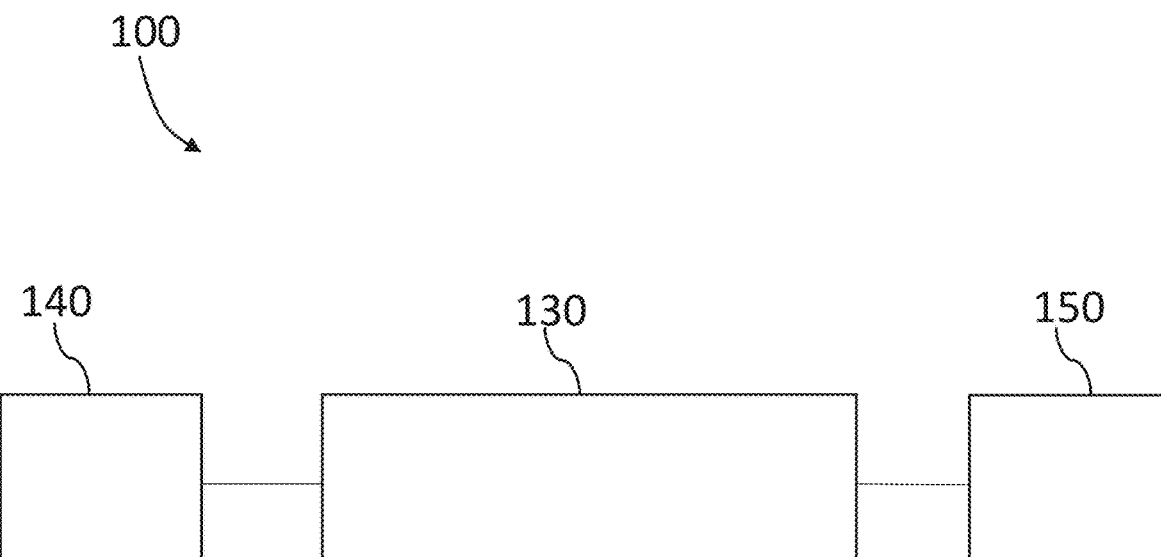
FIG. 1 shows generically, an example of a power transmission network.

FIG. 1 illustrates generically, an example of a power transmission network 100. The illustration is not intended to be limited to representing a particular power transmission scheme, but is moreover provided as a generic example illustrating principles of operation of a power transmission network that are useful for understanding the invention. In this manner, the power transmission network 100 may represent, generically, an AC scheme, or may represent a multiterminal power transmission scheme, for instance. It is considered that FIG. 1 and the associated description are useful for understanding certain aspects and/or context of the invention.

Hence whilst specific features in the illustration are shown connected to each other with a specific number of connections, it will be understood that this is not intended to be limiting either, but moreover to illustrate a generic connection between features/components. Related, is that relative dimensions or distances between components perceived in the illustration are also not intended to be limiting. It will therefore be understood that principles and features in the network 100 and herein discussed can be applied to networks comprising the controller 200 of FIG. 2, the electrical assemblies 300 and 400 of FIGS. 3-4, and to AC networks wherein the methods 500 and 600 are used.

The power transmission network 100 illustrates a first AC network 140 and a second AC network 150. The first AC network 140 and/or second AC network 150 may be electrical power transmission systems comprising power generation apparatus, transmission apparatus, distribution apparatus, and electrical loads. The first AC network 140 and/or second AC network 150 may comprise conventional power generation sources such as coal, gas, hydro etc, or renewable power generation network such as a wind-power generation network, solar-power generation network, bio-power generation network. The first AC network 140 or second AC network 150 may be a consumer network. By way of non-limiting example, the first AC network 140 may be a power generation network, with second AC network 150 being a consumer network, for instance. The AC networks 140, 150 may be AC networks within which the electrical assemblies 300, 400, are deployed, or within which the methods 500, 600 are exercised, for instance.

Also illustrated is a power transmission medium 130 interconnecting the AC networks 140, 150. The power transmission medium 130 may comprise electrical cables, transmission lines, and other electrical components interconnecting the AC networks 140, 150. The power transmission medium 130 provides the medium through which AC power is transmitted between the AC networks 140, 150.

The operation of the power transmission system 100 can be generically described as follows. The first AC power generation network 140 generates AC power that is provided over the power transmission medium 130 to the second AC network 150 for consumption, for instance.

It will be appreciated that various other electrical components may be located at any particular location or with any particular feature/component in the example 100. These may include switches, transformers, reactors, surge arresters, harmonic filters, and other components well known in the art.

Moreover, it will be understood that the power transmission network 100 may be used with three-phase power systems. In a three-phase power system, three conductors supply respective first, second and third phases of AC power to a consumer. Each of the first, second and third phases will typically have equal magnitude voltages or currents, which are displaced in phase from each other by 1200.

In a three-phase power system, phase currents and voltages can be represented by symmetrical components: a positive sequence component; a negative sequence component; and a zero-sequence component. It is the positive sequence component that rotates in phase in accordance with the power system. Hence, in the idealistic scenario, only positive sequence voltage/current will exist. It will be understood that an unbalance in voltage or current between the first, second, and third-phases, of a three-phase system, in magnitude or phase angle, can give rise to undesirable negative and/or zero-sequence components. Such an unbalance can be caused by fault conditions, unbalanced loads, and non-transposed transmission lines, for instance in the AC networks 140, 150.

Either of AC networks 140, 150, may constitute a power supply network within which the invention described herein is deployed/operates. Various different voltage levels can exist when transformers are used to connect systems with different operating voltages while electrical circuits may be connected within the AC networks 140, 150 using switches or circuit breakers. These circuit breakers tend to be designed to have a maximum interrupting short-circuit current rating that is higher than the maximum short circuit current that may flow in the corresponding electrical circuit. This allows the circuit breaker/switch to be opened in the case of a fault, so that the short circuit current can be interrupted.

As described herein, power supply networks continue to expand with new conventional generation plants and new transmission circuits as well as receiving electrical power from renewable power generation networks. These include wind and solar power generation networks. All these additions increase short circuit currents to an extent that the short circuit interrupting rating of existing circuit breakers are approaching, or in some circumstances, exceeding their limits. The solution described herein tends to provide a solution to mitigating this issue.

Figure 2:
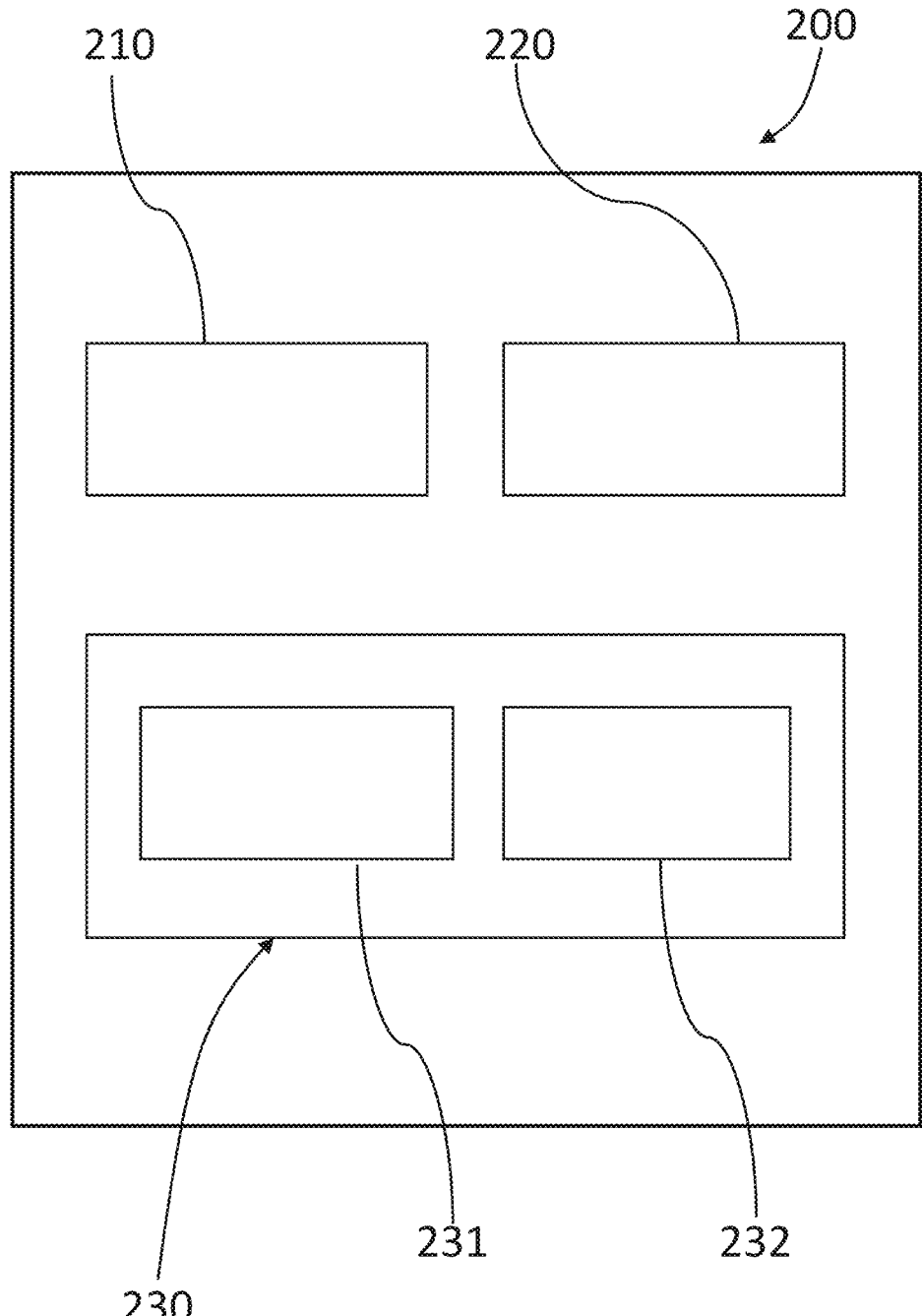
FIG. 2 shows an embodiment of a controller.

FIG. 2 illustrates an embodiment of a controller 200 as may be used in some embodiments of the invention described herein.

The controller 200 comprises a memory 210 and at least one processor 220. The memory 210 comprises computer-readable instructions, which when executed by the at least one processor 220, can cause the controller 200 to perform embodiments of the method/s described herein.

The controller 200 is illustrated as comprising a transceiver arrangement 230 which may comprise a separate transmitter 231 and receiver 232. The transceiver arrangement 230 may be used to operatively communicate with other components or features of embodiments described herein either directly or via a further interface such as a network interface. The transceiver arrangement 230 may for instance send and receive control signals using transmitter 231 and receiver 232. The control signals may contain or define electrical control parameters such as reference currents or reference voltages or commands, for instance for switching means, switches, etc.

The at least one processor 220 is capable of executing computer-readable instructions and/or performing logical operations. The at least one processor 220 may be a micro-controller, microprocessor, central processing unit (CPU), field programmable gate array (FPGA), or similar programmable controller. The controller may further comprise a user input device and/or output device. The processor 220 is communicatively coupled to the memory 210 and may in certain embodiments be coupled to the transceiver 230.

The memory 210 may be a computer readable storage medium. For instance, the memory 210 may include a non-volatile computer storage medium. For example, the memory 210 may include a hard disk drive, flash memory etc.

Whilst not illustrated, the controller 200 may additionally include a user input device interface and/or a user output device interface, which may allow for visual, audible or haptic inputs/outputs. Examples include interfaces to electronic displays, touchscreens, keyboards, mice, speakers and microphones.

Figure 3:
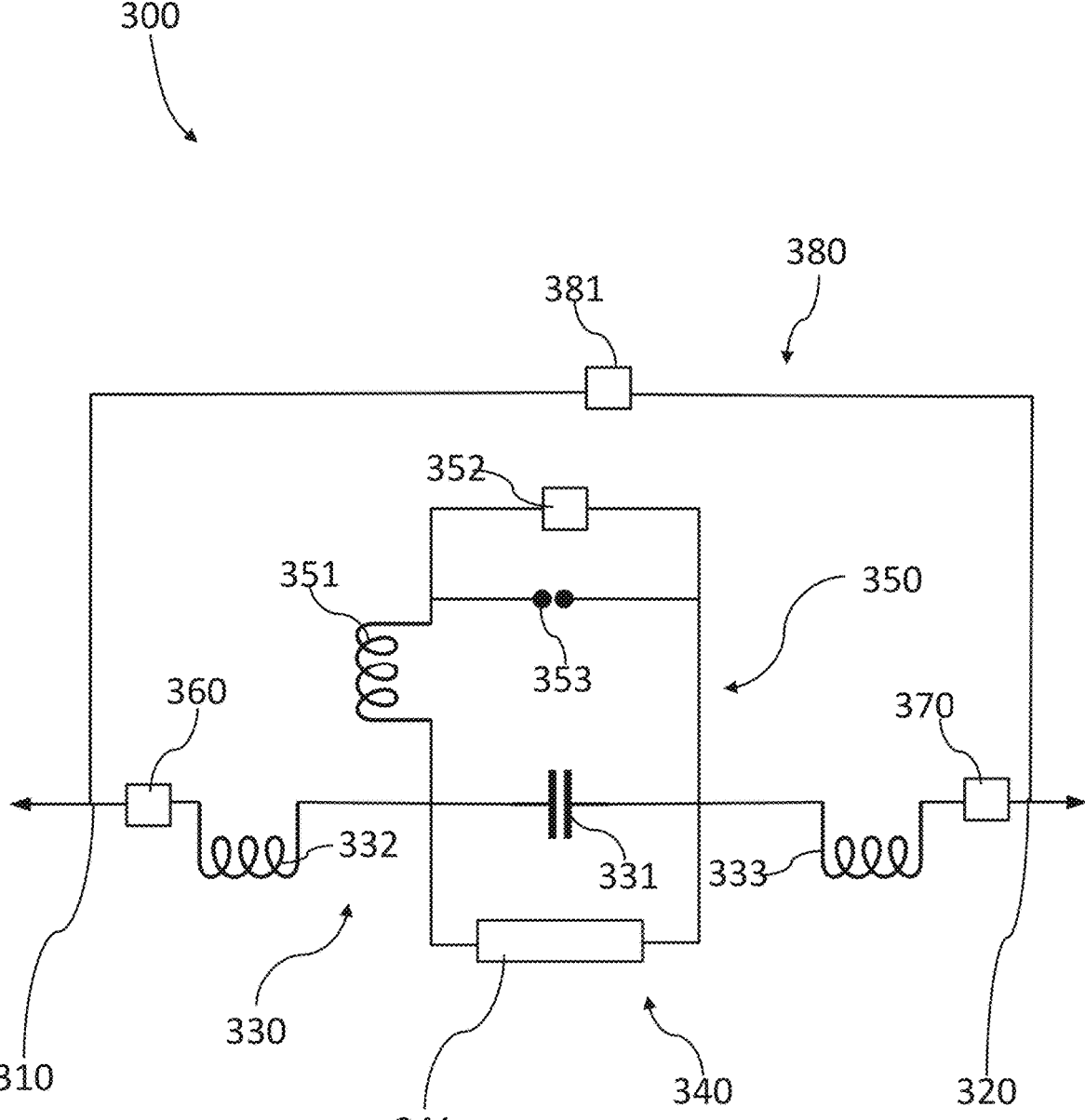
FIG. 3 shows an example of an electrical assembly useful for understanding the invention.

FIG. 3 shows an example of an electrical assembly 300 useful for understanding the invention.

The electrical assembly 300 comprises a first electrical point of connection 310 and a second electrical point of connection 320. The first and second electrical points of connection 310, 320, being for connecting, respectively, to a transmission means of an AC network.

A first subcircuit 330 is also shown as being electrically connected, in series, between the first and second electrical points of connection 310, 320. The first subcircuit 330 comprises a capacitor means in the form of a series capacitor 331 bank.

A first reactor means, in the form of a first reactor 332, is shown electrically connected between the capacitor 331 and the first electrical point of connection 310. The first reactor 332 is in series with the capacitor 331.

A second reactor means, in the form of a second reactor 333 is shown electrically connected between the capacitor 331 and the second electrical point of connection 320. The second reactor 333 is in series with the capacitor 331.

A second subcircuit 340 is shown electrically connected in parallel with the capacitor 331. The second subcircuit 340 comprising a metal-oxide varistor means in the form of a MOV 341.

A third subcircuit 350 is shown electrically connected in parallel with the second subcircuit 340. The third subcircuit 350 comprises a third reactor means, in the form of a third reactor 351. The third subcircuit 350 further comprises a third switching means in the form of a third switch 352 electrically connected in series with the third reactor 351. The third switch 352 being operable between a third conducting state and a third non-conducting state, to respectively connect or disconnect the third subcircuit 350 of the electrical assembly 300. The third subcircuit 350 also comprises a (optional) triggered gap 353 electrically connected in parallel with the third switch 352 and in series with the third reactor 351.

A fourth switching means in the form of a fourth switch 360 is also shown as being electrically connected in series with the first subcircuit 330. The fourth switch 360 is connected between the first subcircuit 330 and the first electrical point of connection 310. The fourth switch 360 is operable between a fourth conducting state and a fourth non-conducting state, to respectively connect or disconnect the first subcircuit 330 from the first electrical point of connection 310.

A fifth switching means in the form of a fifth switch 370 is also shown as being electrically connected in series with the first subcircuit 330. The fifth switch 370 is connected between the first subcircuit 330 and the second electrical point of connection 320. The fifth switch 370 is operable between a fifth conducting state and a fifth non-conducting state, to respectively connect of disconnect the first subcircuit 330 from the second electrical point of connection 320.

The electrical assembly 300 further comprises a fourth subcircuit 380 electrically connecting the first electrical point of connection 310 to the second electrical point of connection 320. The fourth subcircuit 380 comprises a sixth switching means in the form of a sixth switch 381. The sixth switch 381 is operable between a sixth conducting state and a sixth non-conducting state, to respectively bypass or include the first, second and third subcircuits 330, 340, 350 of the electrical assembly 300.

The electrical assembly 300 may be considered as a dual reactor-single capacitor, series resonant FCL/FDL. However, the functionality of the electrical assembly 300 can be further improved as shown in FIG. 4.

Figure 4:
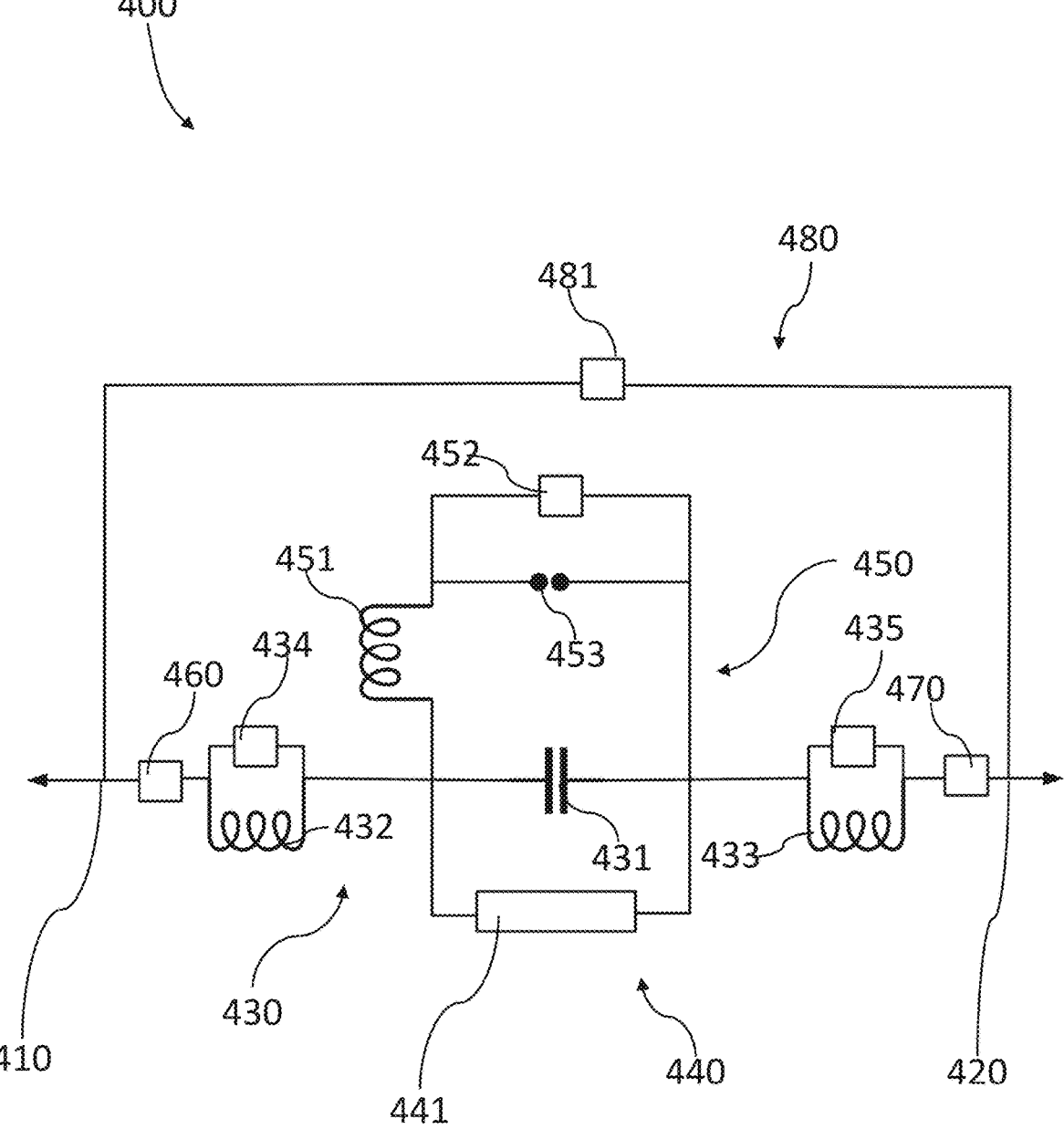
FIG. 4 shows an embodiment of an electrical assembly.

FIG. 4 shows an embodiment of an electrical assembly 400 that improves upon the electrical assembly 300 of FIG. 3.

The electrical assembly 400 comprises a first electrical point of connection 410 and a second electrical point of connection 420. The first and second electrical points of connection 410, 420, being for connecting, respectively, to a transmission means of an AC network.

A first subcircuit 430 is also shown as being electrically connected, in series, between the first and second electrical points of connection 410, 420. The first subcircuit 430 comprises a capacitor means in the form of a series capacitor 431 (which may be a capacitor bank).

A first reactor means, in the form of a first reactor 432, is shown electrically connected between the capacitor 431 and the first electrical point of connection 410. The first reactor 432 is in series with the capacitor 431.

A second reactor means, in the form of a second reactor 433 is shown electrically connected between the capacitor 431 and the second electrical point of connection 420. The second reactor 433 is in series with the capacitor 431.

A first switching means in the form of a first switch 434 is shown electrically connected in parallel with the first reactor 432. The first switch 434 is operable between a first conducting state and a first non-conducting state, to respectively bypass or include the first reactor 432 in the first subcircuit 430.

A second switching means in the form of a second switch 435 is shown electrically connected in parallel with the second reactor 433. The second switch 435 is operable between a second conducting state and a second non-conducting state, to respectively bypass or include the second reactor 433 in the first subcircuit 430.

A second subcircuit 440 is shown electrically connected in parallel with the capacitor 431. The second subcircuit 440 comprising a varistor means in the form of a MOV 441.

A third subcircuit 450 is shown electrically connected in parallel with the second subcircuit 440. The third subcircuit 450 comprises a third reactor means, in the form of a third reactor 451. The third subcircuit 450 further comprises a third switching means in the form of a third switch 452 electrically connected in series with the third reactor 451. The third switch 452 being operable between a third conducting state and a third non-conducting state, to respectively connect or disconnect the third subcircuit 450 of the electrical assembly 400. The third subcircuit 450 also comprises an optional triggered gap 453 electrically connected in parallel with the third switch 452 and in series with the third reactor 451.

A fourth switching means in the form of a fourth switch 460 is also shown as being electrically connected in series with the first subcircuit 430. The fourth switch 460 is connected between the first subcircuit 430 and the first electrical point of connection 410. The fourth switch 460 is operable between a fourth conducting state and a fourth non-conducting state, to respectively connect or disconnect the first subcircuit 430 from the first electrical point of connection 410.

A fifth switching means in the form of a fifth switch 470 is also shown as being electrically connected in series with the first subcircuit 430. The fifth switch 470 is connected between the first subcircuit 430 and the second electrical point of connection 420. The fifth switch 470 is operable between a fifth conducting state and a fifth non-conducting state, to respectively connect of disconnect the first subcircuit 430 from the second electrical point of connection 420.

The electrical assembly 400 further comprises a fourth subcircuit 480 electrically connecting the first electrical point of connection 410 to the second electrical point of connection 420. The fourth subcircuit 480 comprises a sixth switching means in the form of a sixth switch 481. The sixth switch 481 is operable between a sixth conducting state and a sixth non-conducting state, to respectively bypass or include the first, second and third subcircuit 430, 440, 450 of the electrical assembly 400.

When the electrical assembly 400 is in-use, the switches or breakers 434, 435, 452, 460, 470, 481, are individually operated and configured to be in either of their respective conductive or non-conductive states. The operation of the switches 434, 435, 452, 460, 470, 481, may be controlled by a controller such as the controller 200 of FIG. 2. Particular configurations of the switches 434, 435, 452, 460, 470, 481 tend to be advantageous as will now be described with reference to FIG. 4 and Table 1 below.

TABLE 1

| Switch | SC Mode | FCL/FDL Mode | PFM Mode | Out of Service Mode |
|---|---|---|---|---|
| First—434 | Conducting | Non-conducting | Either* | Either |
| Second—435 | Conducting | Non-conducting | Either* | Either |
| Third—452 | Non-conducting | Non-conducting | Conducting | Either |
| Fourth—460 | Conducting | Conducting | Conducting | Non-conducting |
| Fifth—470 | Conducting | Conducting | Conducting | Non-conducting |
| Sixth—481 | Non-conducting | Non-conducting | Non-conducting | Conducting |

*In the PFM Mode, at least one of the first and second switches must be in the non-conducting (i.e., open) configuration.

As shown in Table 1, the electrical assembly 400 can be configured to operate in an SC Mode, an FCL/FDL Mode, a PFM mode or an out of service mode. In SC mode, the electrical assembly 400 tends to strengthen an AC network. If the AC network is strong and if short circuit currents are excessive, this electrical assembly 400 can help limit short circuit currents and operate in the FCL mode. If there are lines operating in parallel which require adjustments in load flow, this electrical assembly 400 can operate in PFM mode. An additional benefit to FCL operation is that FDL operation occurs at the same time and station busses and loads upstream of the FDL tend to resultantly experience limited voltage dips during faults on the downstream side of the FDL.

It is also evident from Table 1 that certain components of the electrical assembly 400 are reused in multiple modes of operation. For instance, in the FCL mode the reactors 432 and 433 are used in addition to the series capacitor 431. In the FDL mode the reactors 432 and 433 are used in addition to the series capacitor 431. In the SC mode the series capacitor 431 is used. In the PFM mode either or both of the reactors 432 and 433 can be used. This discussion is intended to illustrate that the reactors 432 and 433, and the capacitor 431, have a high duty factor as each component is used in three out of the four described modes. Hence there can be a significant cost benefit to the multifunction electrical assembly 400 when compared to providing separate electrical assemblies for each of the described operational modes.

Figure 5:
FIG. 5 shows a further embodiment of an electrical assembly.
Figure 5:
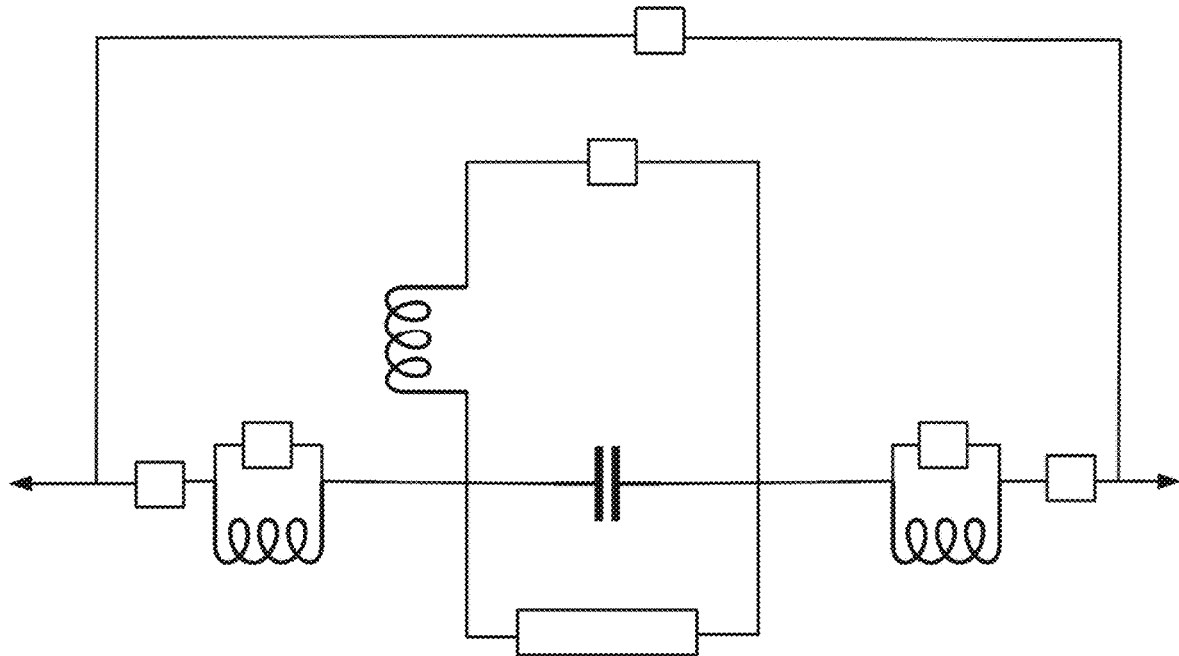

FIG. 5 shows a further embodiment of an electrical assembly 500. The electrical assembly 500 replicates that of FIG. 4 but omitting the triggered gap 453. The triggered gap 453 of FIG. 4 may or may not be present in embodiments of the electrical assemblies described herein.

Figure 6:
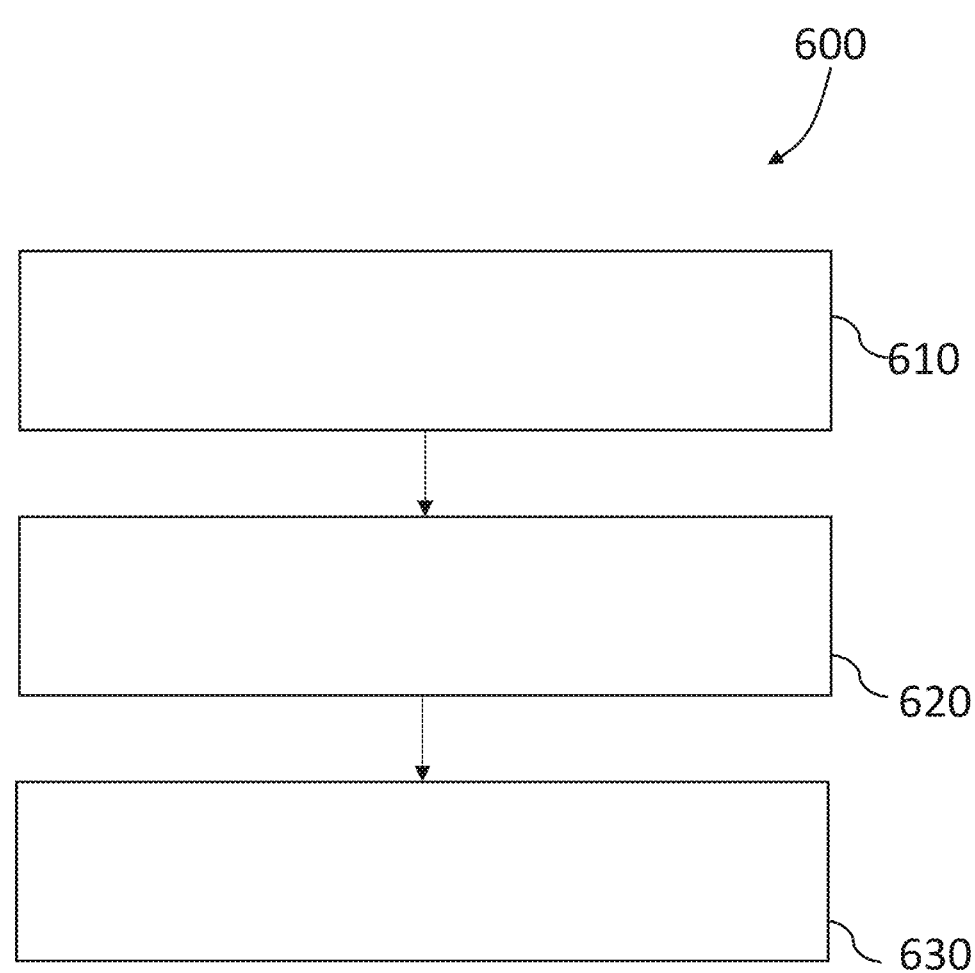
FIG. 6 shows an embodiment of a method of using an electrical assembly.

FIG. 6 shows an embodiment of a method 600 of using an electrical assembly in an AC network.

A first step 610 comprises providing the electrical assembly of the first aspect. This may be the electrical assembly 400 of FIG. 4, or the electrical assembly 500 of FIG. 5, for instance.

A further step 620 comprises electrically connecting the first and second electrical points of connection to a transmission means of an AC network. The first and second electrical points of connection may be the electrical points of connection 410, 420, for instance.

A further step 630 comprises operating at least the first, second and/or third switching means. This may comprise operating the switches 434, 435, 452, 460, 470, 481, for instance. The operation of the switches may be performed by a controller, for instance the controller 200 of FIG. 2.

Figure 7:
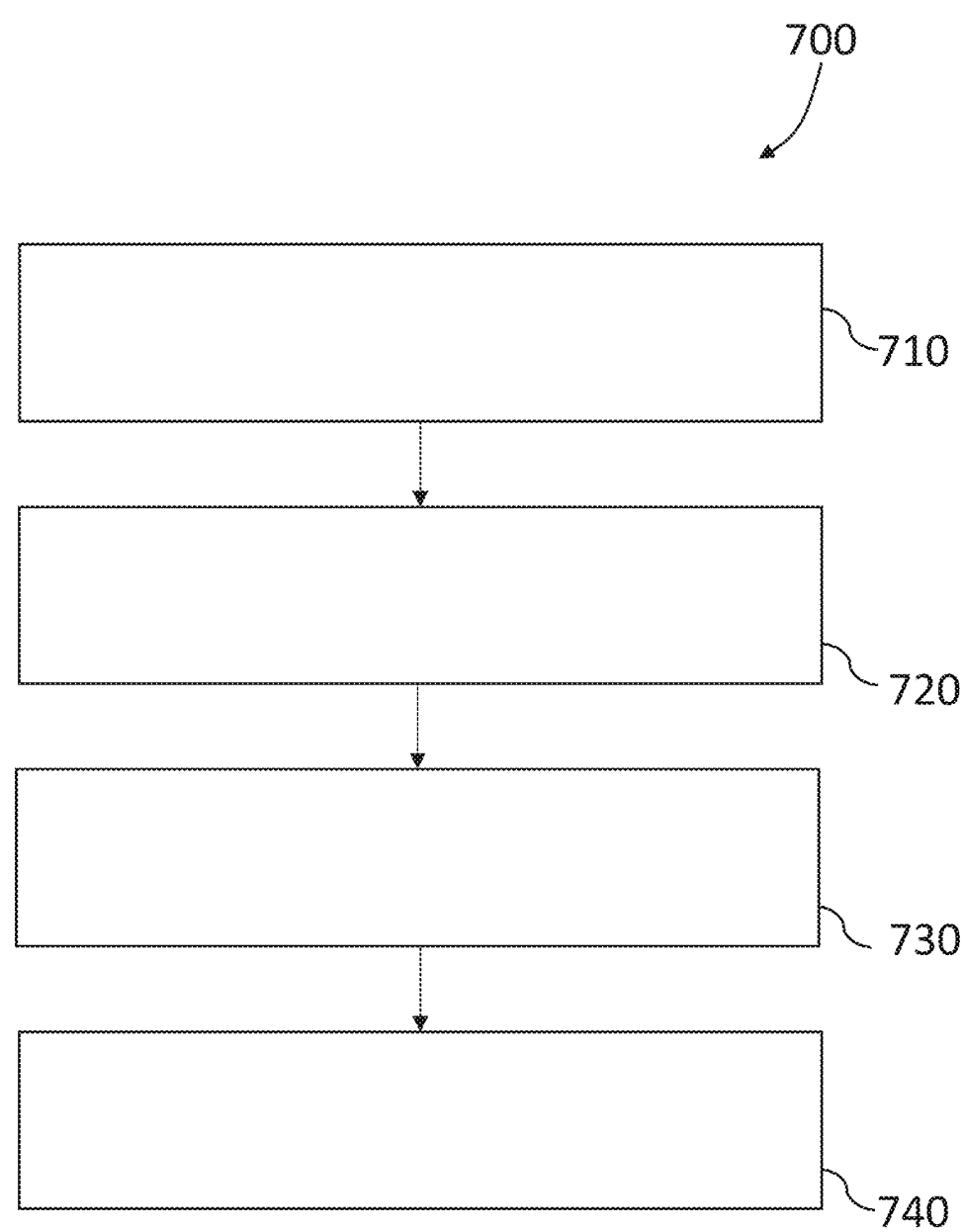
FIG. 7 shows an embodiment of a method of assembling an electrical assembly.

FIG. 7 shows an embodiment of a method 700 of assembling an electrical assembly in an AC network.

A first step 710 comprises providing first and second electrical points of connection, for connecting to a transmission means of an AC network.

A further step 720 comprises assembling a first subcircuit to be electrically connected in series between the first and second electrical points of connection, wherein the assembling the first subcircuit comprises: providing a capacitor means; electrically connecting a first reactor means between the capacitor means and the first electrical point of connection, the first reactor means being in series with the capacitor means; electrically connecting a second reactor means between the capacitor means and the second electrical point of connection, the second reactor means being in series with the capacitor means; electrically connecting a first switching means in parallel with the first reactor means, the first switching means being operable between a first conducting state and a first non-conducting state, to respectively bypass or include the first reactor means in the first subcircuit; electrically connecting a second switching means in parallel with the second reactor means, the second switching means being operable between a second conducting state and a second non-conducting state, to respectively bypass or include the second reactor in the first subcircuit.

A further step 730 comprises assembling a second subcircuit to be electrically connected in parallel with the capacitor means, wherein the assembling the second subcircuit comprises: providing a varistor means.

A further step 740 comprises assembling a third subcircuit to be electrically connected in parallel with the second subcircuit, wherein the assembling the third subcircuit comprises: providing a third reactor means; providing a third switching means, the third switching means being operable between a third conducting state and a third non-conducting state, to respectively connect or disconnect the third subcircuit in the electrical assembly; wherein the third reactor means is either electrically connected in series with the capacitor means or electrically connected in series with the third switching means as part of the third subcircuit.

Whilst the embodiments described herein may refer to a capacitor means, it will be understood that such a term can include a capacitor, a plurality of capacitors, a capacitor bank and/or other capacitive means.

Whilst the embodiments described herein may refer to reactor means, it be understood that such a term can include a reactor, a plurality of reactors, oil-filled reactors, air-core reactors, and/or other reactor means providing the function of a reactor.

Whilst the embodiments described herein may refer to a controller means, it will be understood that such a term can include a controller, a plurality of controllers, at least one processor and a memory, the controller of FIG. 2, and/or other controller means providing the function of a controller.

Whilst the embodiments described herein may refer to switching means, it will be understood that such a term can include a switch, a plurality of switches, switchgear, circuit breakers and/or other switching means providing the function of switching between a conducting and non-conducting state.

Whilst the embodiments described herein may refer to varistor means, it will be understood that such a term can include a varistor, a plurality of varistors, and/or other varistor means providing the function of a varistor.

Whilst the embodiments described herein may refer to switches in conductive states, it will be understood that such a term means the switch is in a closed state i.e., that electrical power can flow through the switch. Similarly, switches in non-conductive states will be understood to be in an open state i.e., that electrical power cannot flow through the switch.

The invention described herein tends to have the advantage of using circuit breakers or switches to insert or bypass various components to create the option to operate in one of 4 modes: 1) series capacitor (SC), 2) fault current limiter (FCL), 3) fault dip limiter (FDL), and 4) power flow modifier (PFM).

Other options may exist for providing each operating mode, separately. The benefits of a SC can also be achieved by adding parallel connected transmission lines and/or adding phase-shifting transformer(s). The benefit of an FCL can be achieved by replacing circuit breakers, ground switches, and bus with higher ratings, if available, or adding series reactors which will affect load flow and voltage profiles usually in a negative way. The benefits of an FDL at the plant level can be solved within a plant with sensitive loads by using equipment such as UPS's (uninterruptable power supplies) or voltage boosting transformers (transformer with power electronics to rapidly compensate for voltage dips. One main driver for the FDL decision is the quantity and cost of devices within a plant that require power conditioning. It is also feasible to use a single capacitor-single reactor FCL/FDL versus a dual reactor-single capacitor FCL/FDL (as shown in FIG. 4 or 5), however the temporary overvoltages are not the same for faults between the capacitor and reactor compared to the dual reactor-single capacitor design provided herein. However, the multifunctionality of the electrical assembly described herein, and the ability to retrofit the assembly to existing components of AC networks, offers significant benefits beyond that which individual separate solutions can provide.

Reference throughout this specification to an example of a particular method or apparatus, or similar language, means that a particular feature, structure, or characteristic described in connection with that example is included in at least one implementation of the method and apparatus described herein. The terms "including", "comprising", "having", and variations thereof, mean "including but not limited to", unless expressly specified otherwise. An enumerated listing of items does not imply that any or all of the items are mutually exclusive, unless expressly specified otherwise. The terms "a", "an", and "the" also refer to "one or more", unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one, and only one, of any single item in the list. For example, "one of A, B and C" includes only A, only B or only C and excludes combinations of A, B and C. As used herein, "a member selected from the group consisting of A, B, and C" includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

Aspects of the disclosed method and apparatus are described with reference to schematic flowchart diagrams and/or schematic block diagrams of methods, apparatuses, systems, and program products. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams.

The schematic flowchart diagrams and/or schematic block diagrams in the Figures illustrate the architecture, functionality, and operation of possible implementations of apparatuses, systems, methods, and program products. In this regard, each block in the schematic flowchart diagrams and/or schematic block diagrams may represent a module, segment, or portion of code, which includes one or more executable instructions of the code for implementing the specified logical function(s).

It will be appreciated that numerical values recited herein are merely intended to help illustrate the working of the invention and may vary depending on the requirements of a given power transmission network, component thereof, or power transmission application.

The listing or discussion of apparently prior-published documents or apparently prior-published information in this specification should not necessarily be taken as an acknowledgement that the document or information is part of the state of the art or is common general knowledge.

Preferences and options for a given aspect, feature or parameter of the invention should, unless the context indicates otherwise, be regarded as having been disclosed in combination with any and all preferences and options for all other aspects, features and parameters of the invention.

I claim:

1. An electrical assembly, comprising:
   a first electrical point of connection and a second electrical point of connection, for connecting, respectively, to a transmission means of an alternating current 'AC' network;
   a first subcircuit electrically connected, in series, between the first and second electrical points of connection, the first subcircuit comprising:
   a capacitor means;
   a first reactor means, electrically connected between the capacitor means and the first electrical point of connection, the first reactor means being in series with the capacitor means;
   a second reactor means, electrically connected between the capacitor means and the second electrical point of connection, the second reactor means being in series with the capacitor means;

a first switching means, electrically connected in parallel with the first reactor means, wherein the first switching means is operable between a first conducting state and a first non-conducting state, to respectively bypass or include the first reactor means in the first subcircuit;

a second switching means, electrically connected in parallel with the second reactor means, wherein the second switching means is operable between a second conducting state and a second non-conducting state, to respectively bypass or include the second reactor means in the first subcircuit;

a second subcircuit, electrically connected in parallel with the capacitor means, the second subcircuit comprising a varistor means;

a third subcircuit, electrically connected in parallel with the second subcircuit, the third subcircuit comprising:

a third switching means, the third switching means being operable between a third conducting state and a third non-conducting state, to respectively connect or disconnect the third subcircuit of the electrical assembly;

wherein the electrical assembly further comprises a third reactor means, the third reactor means being either electrically connected in series with the capacitor means or being electrically connected in series with the third switching means as part of the third subcircuit.

2. The electrical assembly of claim 1, further comprising:

a fourth switching means, electrically connected in series with the first subcircuit, between the first subcircuit and the first electrical point of connection, the fourth switching means being operable between a fourth conducting state and a fourth non-conducting state, to respectively connect or disconnect the first subcircuit from the first electrical point of connection; and a fifth switching means, electrically connected in series with the first subcircuit, between the first subcircuit and the second electrical point of connection, the fifth switching means being operable between a fifth conducting state and a fifth non-conducting state, to respectively connect of disconnect the first subcircuit from the second electrical point of connection.

3. The electrical assembly of claim 2, further comprising:

a fourth subcircuit, electrically connecting the first electrical point of connection to the second electrical point of connection, wherein the fourth subcircuit comprises:

a sixth switching means, the sixth switching means being operable between a sixth conducting state and a sixth non-conducting state, to respectively bypass or include the first, second and third subcircuits of the electrical assembly.

4. The electrical assembly of claim 3, wherein either:

the fourth and fifth switching means are configured in the respective fourth and fifth conducting states, and the first, second, third and sixth switching means are configured in the respective first, second, third and sixth non-conducting states, such that the electrical assembly operates as a fault current limiter 'FCL' and/or a fault dip limiter 'FDL';

the first, second, fourth, and fifth switching means are configured in the respective first, second, fourth and fifth conducting states, and the third and sixth switching means are configured in the respective third and sixth non-conducting states, such that the electrical assembly operates as a series-capacitor 'SC';

the third, fourth, and fifth switching means are configured in the respective third, fourth and fifth conducting states, the sixth switching means is configured in the sixth non-conducting state, and at least one of the first and second switching means are configured in the respective first and second non-conducting state, such that the electrical assembly operates as a power flow modifier 'PFM'; or the sixth switching means is configured in the sixth conducting state, the fourth and fifth switching means are configured in the respective fourth and fifth non-conducting states, such that the electrical assembly operates in an out-of-service state.

5. The electrical assembly of claim 3, further comprising:

a controller means configured to provide respective control signals to the first, second, third, fourth, fifth, and sixth, switching means, to operate the first, second, third, fourth, fifth and sixth switching means between their respective conducting and non-conducting states.

6. The electrical assembly of claim 1, wherein:

the varistor means comprises a metal-oxide varistor 'MOV'.

7. The electrical assembly of claim 1, wherein:

the first, second and third reactor means comprise respective air-core, iron-core, or oil-filled reactors.

8. The electrical assembly of claim 1, wherein the third subcircuit further comprises a triggered gap and/or a power electronics.

9. An AC network, comprising:

a transmission means; and the electrical assembly of claim 1, wherein first and second electrical points of connection are electrically connected to the transmission means.

10. The AC network of claim 9, wherein:

the first and second electrical points of connection are electrically connected in series to one or more transmission lines of the transmission means; or the first and second electrical points of connection are electrically connected to split an electrical bus or busses of the transmission means, into two or more sections.

11. The AC network of claim 9, configured to operate at: an AC voltage between distribution voltage and ultra-high voltage 'UHV'.

12. The AC network of claim 9, where the AC network comprises a renewable power generation network.

13. The AC network of claim 9, configured to operate at: an AC voltage above 100 kV.

14. The AC network of claim 9, configured to operate at: an AC voltage between 100 kV and 765 kV.

15. The AC network of claim 9, wherein the AC network comprises a solar power generation network.

16. The AC network of claim 9, wherein the AC network comprises a wind power generation network.

17. A method of operating an electrical assembly in an AC network, the method comprising:

providing the electrical assembly of claim 1;

electrically connecting the first and second electrical points of connection to a transmission means of an AC network; and then operating at least the first, second and/or third switching means.

18. A method of assembling an electrical assembly for an AC network, the method comprising:

providing first and second electrical points of connection, for connecting to a transmission means of an AC network;

assembling a first subcircuit to be electrically connected in series between the first and second electrical points of connection, wherein the assembling the first subcircuit comprises:

providing a capacitor means;

electrically connecting a first reactor means between the capacitor means and the first electrical point of connection, the first reactor means being in series with the capacitor means;

electrically connecting a second reactor means between the capacitor means and the second electrical point of connection, the second reactor means being in series with the capacitor means;

electrically connecting a first switching means in parallel with the first reactor means, the first switching means being operable between a first conducting state and a first non-conducting state, to respectively bypass or include the first reactor means in the first subcircuit;

electrically connecting a second switching means in parallel with the second reactor means, the second switching means being operable between a second conducting state and a second non-conducting state, to respectively bypass or include the second reactor in the first subcircuit;

assembling a second subcircuit to be electrically connected in parallel with the capacitor means, wherein the assembling the second subcircuit comprises:

providing a varistor means;

assembling a third subcircuit to be electrically connected in parallel with the second subcircuit, wherein the assembling the third subcircuit comprises:

providing a third reactor means;

providing a third switching means, the third switching means being operable between a third conducting state and a third non-conducting state, to respectively connect or disconnect the third subcircuit in the electrical assembly; wherein the third reactor means is either electrically connected in series with the capacitor means or electrically connected in series with the third switching means as part of the third subcircuit.

19. The method of claim 18, further comprising:

electrically connecting a fourth switching means in series with the first subcircuit, and between the first subcircuit and the first electrical point of connection, wherein the fourth switching means is operable between a fourth conducting state and a fourth non-conducting state, to respectively connect or disconnect the first subcircuit from the first electrical point of connection;

electrically connecting a fifth switching means in series with the first subcircuit, and between the first subcircuit and the second electrical point of connection, wherein the fifth switching means is operable between a fifth conducting state and a fifth non-conducting state, to respectively connect or disconnect the first subcircuit from the second electrical point of connection; and assembling a fourth subcircuit electrically connecting the first electrical point of connection to the second electrical point of connection, wherein the assembling the fourth subcircuit comprises:

electrically connecting a sixth switching means, the sixth switching means being operable between a sixth conducting state and a sixth non-conducting state, to respectively bypass or include the first, second and third subcircuits in the electrical assembly.

* * * * *